April 6, 1926.
E. E. LUNDBERG
1,579,875
SNAP-ON NUT
Filed March 24, 1924
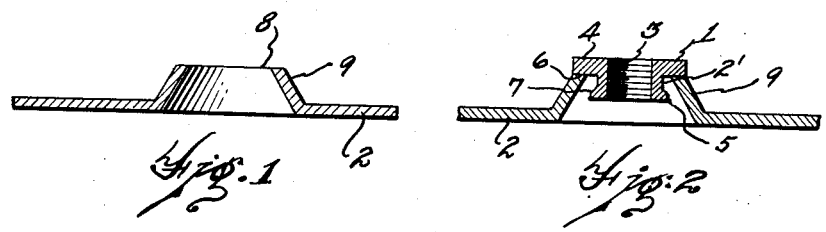
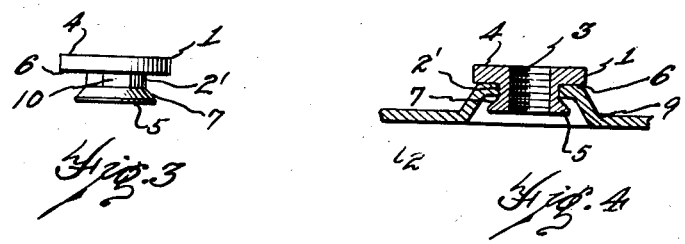
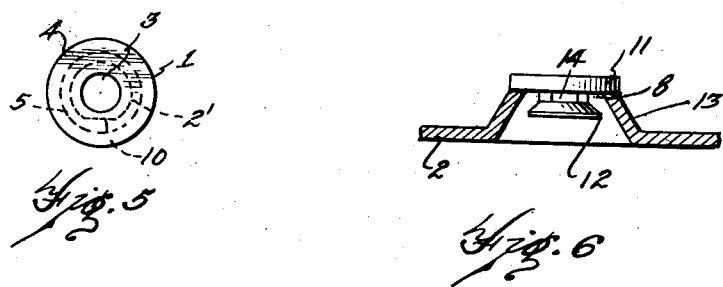
INVENTOR.
Everett E. Lundberg
BY
ATTORNEY.

Patented Apr. 6, 1926.

1,579,875

UNITED STATES PATENT OFFICE.

EVERETT E. LUNDBERG, OF DETROIT, MICHIGAN, ASSIGNOR TO BRIGGS MANUFACTURING COMPANY, OF DETROIT, MICHIGAN, A CORPORATION OF MICHIGAN.

SNAP-ON NUT.

Application filed March 24, 1924. Serial No. 701,504.

*To all whom it may concern:*

Be it known that I, EVERETT E. LUNDBERG, a citizen of the United States of America, residing at Detroit, in the county of Wayne and State of Michigan, have invented certain new and useful Improvements in Snap-On Nuts, of which the following is a specification, reference being had therein to the accompanying drawings.

This invention relates generally to nuts that are adapted to be secured to sheet metal supports such as panels or pillars of vehicle bodies and are adapted to receive the securing elements for molding, locks or other articles designed to be attached to such supports.

One of the essential objects of the invention is to provide a strong and durable nut that may be secured to the support in such a manner that it will be prevented from turning or moving relative to the support, particularly when a securing element is engaged therewith to attach an article to the support.

With the above and other objects in view the invention consists in certain novel features of construction, combinations and arrangements of parts as will be more fully described and particularly pointed out in the appended claims.

In the accompanying drawings:—

Figure 1 is a longitudinal sectional view through a portion of the sheet metal support before the nut is attached thereto;

Figure 2 is a view similar to Figure 1 but showing the nut applied to the opening in the support before being pressed inwardly.

Figure 3 is an elevation of the nut;

Figure 4 is a sectional view through the support and nut when the latter is secured to the support;

Figure 5 is a top plan view of the nut;

Figure 6 is an elevation of a slightly modified form of nut.

Referring now to the drawing in which like characters of reference designate corresponding parts throughout the several views, the numeral 1 designates a nut that is adapted to be permanently secured to a sheet metal support such as a door pillar 2. The body portion 2' of the nut is preferably cylindrical in form and is provided with a threaded bore 3 for receiving a suitable exteriorly threaded securing element (not shown) for attaching a lock or other article to the support. The body portion of the nut is preferably relatively short in length and is provided at the ends thereof with peripheral flanges 4 and 5 respectively that are adapted to engage the opposite sides of the sheet metal support when secured thereto. The flange 4 is preferably circular in form and is provided with a flat inner face 6, while the flange 5 is also circular in form but is considerably smaller in diameter than the flange 4 and is provided with a beveled inner face 7.

To secure the nut to the support 2, the latter is initially provided with an opening 8 that has substantially the same diameter as the outer diameter of the nut 1. The metal surrounding the opening is then pressed outwardly by suitable means (not shown) to form a substantially frusto-conical portion 9, whereby the opening 8 is enlarged sufficiently to receive the flange 5. This flange is then moved through the opening 8 so that the flange 4 will rest against the outer edges of the opening as shown in Figure 2 of the drawing, whereupon a suitable die member (not shown) is preferably used to press the nut inwardly so that the frusto-conical portion 9 will be contracted against the body of the nut between the flanges 4 and 5 as shown in Figure 4 of the drawing. During this operation the flange 4 will force the frusto-conical portion inwardly while the flange 5 will form a bearing therefor and will guide the same toward the body of the nut.

To prevent the nut from turning or moving relative to the support when secured thereto, the nut is preferably provided between the flanges 4 and 5 with a flattened portion 10 against which a part of the frusto-conical portion 9 will be forced when it is contracted against the nut.

As shown in Figure 6, the space between the flanges 4 and 5 of the nut may be materially less than the thickness of the sheet metal forming the support so that when the nut is pressed inwardly to be secured to the support the edges of the opening 8 will be distorted between the flanges 11 and 12 so that a greater portion of the frusto-conical portion 13 will be forced against the flattened portion 14 of the nut.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim as my invention is:—

1. In combination, a nut having a body portion provided with a threaded bore and longitudinally spaced peripheral flanges, one flange having a flat inner face, the second flange having an inclined face extending inwardly from the outer edge thereof to said body, the said body having a flattened peripheral surface between said flanges, and a sheet metal panel having an opening receiving the body of said nut between said flanges, the metal of the panel between said flanges being held by the inclined face of the second flange against the flat face of the first flange and having portions so tightly bearing against the flattened surface of said body that the said nut is prevented from rotating relative to said panel.

2. In combination, a sheet metal panel having an opening therein, and a nut having a substantially cylindrical body extending through said opening, said body having a threaded bore extending throughout its length and having longitudinally spaced peripheral flanges, said flanges being located upon opposite sides of said panel, one flange having a substantially flat inner face, the second flange having an inclined surface extending inwardly from the outer edges thereof to the body and holding the metal of the panel against the flat face of said first flange, the said body having a flattened peripheral surface between said flanges, the distance between the flat face of the first flange and the inner end of the inclined surface of the second flange being less than the thickness of the sheet metal panel, and portions of the metal of said panel between said flanges so tightly bearing against the flattened surface of the body that the nut is held by said distorted portions against rotation relative to said panel.

In testimony whereof I affix my signature.

EVERETT E. LUNDBERG.